US007676539B2

(12) United States Patent
Jhoney et al.

(10) Patent No.: US 7,676,539 B2
(45) Date of Patent: Mar. 9, 2010

(54) METHODS, APPARATUS AND COMPUTER PROGRAMS FOR AUTOMATED PROBLEM SOLVING IN A DISTRIBUTED, COLLABORATIVE ENVIRONMENT

(75) Inventors: Albee Jhoney, Karnataka (IN); Manu Kuchhal, Muzaffarnagar (IN); Umasuthan Ramakrishnan, Coimbatore (IN); Deepak M Srinivasa, Bangalore (IN); S Venkatakrishnan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1115 days.

(21) Appl. No.: 11/149,421

(22) Filed: Jun. 9, 2005

(65) Prior Publication Data

US 2007/0011281 A1    Jan. 11, 2007

(51) Int. Cl.
*G06F 15/16*    (2006.01)
*G06F 15/177*    (2006.01)
*G06Q 40/00*    (2006.01)

(52) U.S. Cl. ..................... 709/202; 709/205; 709/220; 705/37

(58) Field of Classification Search .............. 709/203, 709/220, 202, 205
See application file for complete search history.

(56) References Cited

U.S. PATENT DOCUMENTS 5,819,243 A * 10/1998 Rich et al. ..................... 706/11
6,285,977 B1 * 9/2001 Miyazaki ..................... 703/26
2004/0088206 A1 * 5/2004 Thompson et al. ............. 705/7
2005/0034134 A1 * 2/2005 Lieblich et al. ............. 719/318

OTHER PUBLICATIONS

Shen et al., A Hybrid Agent-Oriented Infrastructure for Modeling Manufacturing Enterprises, Proceedings of W '98.*
Smith, "The Contract New Protocol: High-Level Communication and Control in a Distributed Problem Solver", Ransactions on Computers, vol. C-29, No. 12, pp. 1104-1113, Dec. 1980.*
Sim et al., "Simulation of a Multi-agent Protocol for Task Allocation in Cooperative Design", 1999, IEEE.*
S. Tuecke et al., "Open Grid Services Infrastructure (OGSI) Version 1.0", Jun. 2003, (available from 222.gridforum.org).

(Continued)

*Primary Examiner*—Rupal D Dharia
*Assistant Examiner*—Lin Liu
(74) *Attorney, Agent, or Firm*—George R. McGuire; David B. Woycechowsky; Bond, Schoeneck & King, PLLC

(57) ABSTRACT

Provided are methods, apparatus or computer programs for collaborative problem solving and/or automated discovery and dynamic integration of capabilities in a distributed, multidisciplinary work environment. A set of software-implemented agents distributed across a network are used to identify agents and resources on the network that are capable of performing required tasks. The agents collaborate to generate a plan comprising a task allocation and task execution sequence in which tasks are allocated to selected ones of the agents and identified resources, and then the selected agents and resources execute the allocated tasks in accordance with the generated plan. Services (such as processing functions and knowledge) provided by hardware and software resources in a network are represented as 'capabilities' of an associated agent. The functions implemented by each agent are also represented as 'capabilities'. The abstract 'capabilities' can be published and then discovered and dynamically integrated to solve domain specific problems.

15 Claims, 6 Drawing Sheets

OTHER PUBLICATIONS

Ian Foster, Carl Kesselman, Jeffrey Nick, Steven Tuecke, "The Physiology of the Grid: An Open Grid Services Architecture for Distributed Systems Integration", Jun. 2002, (available from 222.globus.org).

Luc Moreau, "Agents for the Grid: a Comparison with Web Services (Part 1: Transport Layer")", Proc 2nd, IEEE/ACM International Smposium on Cluster Computing and the GRID, 2002.

Arturo Avila-Rosas, Luc Moreau, Vijay Dialani, Simon Miles, and Xiaojian Liu, "Agents for the Grid: A comparison with Web Services (part II: Service Discovery)", Proceedings of ACM AAMAS'02, Jul. 2002, Bologna, Italy.

Weiming Shan and Yangsheng Li, Hamada H. Ghenniwa and Chun Wang, "Adaptive Negotiation for Agent-Based Grid Computing," Proceedings of ACM AAMAS'02, Jul. 2002, Bologna, Italy.

Thompson, C., "Characterizing the Agent Grid", Technical Report, Object Services Consulting, Inc., Dec. 1998 (available from http://www.objs.com/agility/tech-reports/9812-grid.html).

Konstantinos Karasavvas, Albert Burger, and Richard Baldock, "A Multi-Agent Bioingormatics Integration System with Adjustable Autonomy: An Overview", Proceedings of ACM AAMAS'02, Jul. w00w, pp. 302-303, Bologna, italy.

David De Roure, Nicholas Jennings, Nigel Shadbolt, Research Agenda for the Semantic Grid: A Future e-Science Infrastructure, Dec. 01 (downloaded from 222.semanticgrid.org/v1.9/semgrid.pdf on Jun. 22, 2004).

Line Pouchard and David W Walker, "Community of Agents for User Support in :$\alpha$ Problem Solving Environment", Proceedings of the Workshop on Infrastructure for Multi-Agent Systems, ed. Tom Wagner and Omer F. Rana, Jun. 3-4, 2000, Barcelona, Spain.

Junwei Cao, Daniel P. Spooner, James D. Turner, Stephen A. Jarvis, Subhash Saini, Darren J. Kerbyson, and Graham R. Nudd, "Agent-based Resource Management for Grid Computing", Scientific Programming, Special Issue on GridComputing, IOS Press, 2002.

Barbara J. Grosz and Sarit Kraus, "Collaborative Plans for Complex Group Action", Artifical Intelligence 86(2):269-357, 1996, Elsevier Science Publishers, Essex, UK.

U.S. Appl. No. 10/720,894, filing date Nov. 24, 2003 (pending), "Collaborative Planning Actions and Recipes", Deepak M. Srinivasa.

\* cited by examiner

METHODS, APPARATUS AND COMPUTER PROGRAMS FOR AUTOMATED PROBLEM SOLVING IN A DISTRIBUTED, COLLABORATIVE ENVIRONMENT

CROSS REFERENCE TO RELATED APPLICATION

The present application claims priority to U.S. patent application Ser. No. 10/720,984, filed on Nov. 24, 2003 and entitled "Collaborative Planning Actions and Recipes;" all of the foregoing patent-related document(s) are hereby incorporated by reference herein in their respective entirety(ies).

FIELD OF INVENTION

The present invention provides methods, apparatus and computer programs for problem solving in a distributed data processing environment. The invention has applications for increasing automation, integration and collaboration in multi-discipline work environments and for scientific problem solving.

BACKGROUND

In recent years, many areas of science and technology have benefited enormously from advances in information technology (IT). For example, the combination of increased processing power and speed, improved communications and advanced data management systems have enabled the life sciences and healthcare industries to solve highly complex problems with far greater ease than was previously possible. The results have included new scientific discoveries, development of new drugs, as well as new treatment methodologies. Combined with recent advances in biology and the convergence between modem biology and healthcare, IT is playing an important role in improving upon the efficacy, reach and methodology of current healthcare practices.

The union of ideas, expertise and disciplines makes some bright promises for the future, but convergence between life sciences and IT has also led to a plethora of challenges and requirements that have not yet been met. Domain experts such as biologists, chemists, doctors and clinicians face the daunting task of consolidating their core expertise with the knowledge of IT advancements at a very low level of abstraction. There are several other important issues such as how to achieve collaboration, integration, automation and resource management across multiple teams spread across different disciplines, departments, organizations and geographies. These challenges currently act as deterrents to the realization of the true potential of the convergence between life sciences and IT.

Similar challenges exist in other areas of science and technology, and other multi-discipline work environments. There is a need for improved collaboration and integration to make better use of the capabilities of recent advances in IT.

Provision of services over a distributed, heterogeneous network has typically relied on IT developers writing appropriate wrappers for existing resources, to enable interoperability, or ensuring that the resources conform to Grid-middleware standards (OGSA). The Grid is an infrastructure that enables the integrated, collaborative use of high-end computers, networks, databases and scientific instruments owned and managed by multiple organizations. Grid computing provides an open and standard platform for sharing of resources as Grid services, as described in the OGSI Working Group's specification '*Open Grid Services Infrastructure Version 1.0*', S. Tuecke, K. Czajkowski, I. Foster, J. Frey, S. Graham, C. Kesselman, T. Maguire, T. Sandholm, P. Vanderbilt, D. Snelling, June 2003. Problems may be solved using resources on the Grid after encoding the problem as Grid jobs submitted via a Grid portal. Dynamic integration of services of distributed resources is described in '*The Physiology of the Grid: An Open Grid Services Architecture for Distributed Systems Integration*' I. Foster, C. Kesselman, J. M. Nick and S. Tuecke, June 2002.

SUMMARY

Various aspects of the present invention provide methods, apparatus or computer programs for collaborative problem solving and/or automated discovery and dynamic integration of capabilities in a distributed, multidisciplinary work environment.

A first embodiment of the invention provides a method for collaborative problem solving within a distributed data processing network. The method includes comparing services required by a service requestor with capabilities of service-provider agents distributed across the network, to identify a set of service-provider agents and underlying resources capable of collaborating to provide the required services. The service-provider agents provide an access mechanism for accessing the services of respective underlying resources. The capabilities are abstract representations of functions implemented by the service-provider agents and of services provided by the respective underlying resources. The method also includes generating a plan comprising a task allocation and task execution sequence for the identified set of agents and underlying resources, and using the identified set of agents and underlying resources to execute tasks in accordance with the generated plan.

In a collaborative problem solving method according to one embodiment of the invention, a set of software-implemented agents distributed across a network are used to identify agents and resources on the network that are capable of performing required tasks. The agents generate a plan comprising a task allocation and task execution sequence in which tasks are allocated to selected ones of the agents and identified resources. The selected agents and resources then execute the allocated tasks in accordance with the generated plan to solve the problem.

Agents are known to be computer programs that can communicate with each other and perform their functions on behalf of an end user without requiring constant involvement of the user—for example gathering information from a network and processing that information for presentation to the user. Agents may execute their functions periodically or in response to trigger conditions. The agents according to one embodiment of the present invention include computer programs encapsulating instructions for performing a set of functions together with associated data and representations of services provided by underlying resources.

In this context, a resource may be a data processing resource such as a computer, a data library and retrieval system, a specialized scientific apparatus or other hardware. The resources may include application programs or tools, or the knowledge and skills of a person or a team of people (for example, domain experts such as scientists or doctors) in their capacity as service providers to the networked community.

In one embodiment, services (such as processing functions and knowledge) provided by each resource are represented as 'capabilities' of an associated agent. The functions implemented by each agent are also represented as 'capabilities'. This abstraction of different resource types and various methods, knowledge and services under a generic 'capability' representation simplifies users' perspectives of interactions between the various agents and resources. The abstract representation of capabilities, combined with a set of collaborating agents distributed across a service-oriented network that include means for discovery of required capabilities and means for accessing those capabilities, facilitates dynamic discovery and integration of resources and capabilities of different types. Descriptions of the 'capabilities' can be published and then discovered and dynamically integrated to solve domain specific problems.

The capabilities of each of a plurality of agents and resources within the network, including a description of the methods implemented by each agent and services provided by each resource, are stored in a network-accessible repository (e.g. registry). Agents can access this repository to provide a capabilities brokering function—discovering capabilities of other agents and resources that are relevant to a submitted problem, and selecting agents and resources than can be integrated to solve the problem. The registry, or an associated information repository, also contains a description of an access mechanism for accessing each resource.

The network may be a heterogeneous services-oriented network based on the Grid, on which capabilities are accessed as utilities and integrated dynamically to solve a defined problem. However, references to a 'Grid' hereafter are intended to encompass any distributed set of resources having basic interconnectivity with each other (for example using TCP/IP over the Internet), without limitation to Grid-middleware standards (OGSI or OGSA). The resources may be exposed as services implemented via heterogeneous technologies such as Remote Method Invocation (RMI), Common Object Request Broker Architecture (CORBA), Web services or Grid services. An infrastructure according to an embodiment of the invention implements Web services standards to support requesting and provision of services, using the abstract 'capabilities' representation and implementing a dynamic binding and invocation of resource services via capability proxy objects (see below). This avoids the need for IT developers to pre-package every resource within a specific wrapper. The registry may be a distributed registry and directory service.

Thus, in one embodiment, resources and their services are accessed by collaboration between agents which are loosely bound to the various resources and agents representing service-requesting entities. In the embodiment, individual agents register their capabilities in a service registry. When a service requestor requires performance of a task, the agents collaborate to compare requested services with descriptions of capabilities stored in the registry, to identify suitable computing resources for performing the task.

A requested task may be decomposed into subtasks by the agents. The agents collaborate to identify agents and resources capable of performing the required task or subtasks, subtasks are assigned to agents and resources and executed autonomously, and the results of this processing are collated by the network of capability agents and presented to the user.

The capabilities may be published as capability definitions (descriptions of functions and services) and accessed using a capability adapter within the local agent. The capability adapter provides implementation-specific information for each published capability, and provides capability proxy objects for dynamically binding and invoking the underlying resource functions. The capability proxy object may encapsulate details of the technology and protocols to be used for other agents to interact with the respective capability. The proxy objects can be stored in the network-accessible registry, and may be downloaded to a client system for use to handle interactions with the service that implements the published capability.

In one embodiment, support services are provided by a Virtual Entity Platform (VEP) which hosts one or more local agents as well as messaging functions, agent management functions, planning and plan execution functions and an information repository. Database capabilities, application server capabilities and visualization capabilities may be implemented in the VEP. Running on top of the VEP are Virtual Entities—the agents that encapsulate application tasks (such as database searching routines, biological sequence alignment through Web-based applications, and graph drawing algorithms). An abstract interface provided by the VE and VEP simplifies user interactions with data processing platforms and application software packages—shielding users from the complexities of underlying communication protocols and other access mechanism details.

The published capabilities of a resource may include a range of different information, such as a description of technical characteristics of the resource, a description of skills required by a user of the resource, and task-specific information for tasks performed by the resource. There may be functional capabilities that abstract technical know-how, domain expertise and algorithms for solving particular problems and serve to make the algorithms and information available as services with well-defined interfaces. There may also be platform capabilities that abstract the access and usage of the various computational platforms and application packages available on the network, which can be used to make such computational platforms available as utilities with a well-defined set of interfaces irrespective of their internal complexities. The functional and platform capabilities may be obtained through a resource negotiation based on the tasks to be performed, the services provided by each resource and specified quality of service parameters.

A further embodiment of the present invention provides a network of distributed agents with problem solving capabilities. The agents are deployed across a service oriented network and each agent publishes a description of its encapsulated methods and the services provided by its underlying resources. The capabilities of the agents and underlying resources are discovered and integrated on demand, based on the required and available tasks, services and QoS. Proxy objects provide a mechanism for dynamic binding to resources. The collaborating agents can each autonomously perform their sub-tasks to contribute to the overall solution of the problem.

The invention enables automated, collaborative problem solving, with widely distributed computing resources shared and managed as if they are one large virtual computer. The resources and their services may be accessed as utilities. Users of the network (such as scientific researchers or clinicians) can use the environment to share their skills and resources across a geographically wide-spread community, and they may delegate or 'outsource' domain-specific problems to the agents of the problem solving environment.

A further embodiment provides a data processing apparatus comprising a processing unit, a data storage unit, and a collaborative problem solving environment comprising a set of software-implemented agents that can be integrated with other agents in a network to identify computing resources that are capable of performing required tasks, to generate a plan comprising a task allocation and task execution sequence in which tasks are allocated to selected ones of the identified resources, and then to execute the allocated tasks in accordance with the generated plan to solve the problem.

A data processing apparatus according to a further embodiment of the invention includes a data processing unit, a data storage unit, and at least one service requester agent program. The service requestor agent can receive input service requests and perform the steps of: analyzing the request to determine required capabilities to service the request; accessing a service registry storing definitions of capabilities associated with each of a plurality of service provider agents distributed across the network, wherein the capabilities comprise representations of functions implemented by the service-provider agents and by underlying resources, and comparing the determined required capabilities with the definitions of capabilities stored in the registry to identify service provider agents having the required capabilities; and contacting at least one identified service provider agent having the required capabilities and requesting performance of a service corresponding to the required capabilities.

In another embodiment of the invention, a data processing apparatus comprises a data processing unit, a data storage unit, at least one resource for facilitating problem solving, and at least one service provider agent program having a set of capability definitions associated with the service provider agent. The associated capability definitions define functions implemented by the service provider agent and the at least one resource. The service provider agent program is responsive to receipt of a service request including one of the set of capability definitions, to bind to and invoke at least one of the functions implemented by the service provider agent and the at least one resource.

A further embodiment of the invention provides a data processing apparatus comprising a data processing unit, a local computer program agent and a data storage unit storing a registry of capability definitions that define capabilities associated with each of a plurality of service provider agents distributed across the network, wherein the capabilities comprise representations of functions implemented by the service-provider agents and by underlying resources associated with the service provider agents. The local computer program agent provides a mechanism for accessing the registry, in response to a request from a service requestor that specifies required capabilities. A comparison is then performed between the specified required capabilities and capability definitions stored in the registry, to identify service provider agents having the required capabilities.

BRIEF DESCRIPTION OF DRAWINGS

Embodiments of the invention are described below in detail, by way of example, with reference to the accompanying drawings in which.

DETAILED DESCRIPTION OF PREFERRED EMBODIMENTS

Described below is an agent-based infrastructure for distributed, collaborative problem solving. The components of the infrastructure can dynamically combine virtualized resources to derive a solution for a given problem. The derived solution is then executed by invoking the relevant capabilities of the resources.

The components of the infrastructure may be distributed over a wide area network of heterogeneous data processing apparatus with minimal central control. The software entities (agents) can act autonomously, communicating and collaborating with each other when required. Each agent is endowed with some methods that contribute towards the services of the infrastructure, such as the ability to plan a solution. Each user of the environment (whether a service-providing domain expert, a researcher needing assistance from remote resources, or a system administrator) owns one or more of these agents. To each owned agent, the user may attribute one or more capabilities that the user would like to share across the community. Thus, the distributed environment includes a community of agents possessing different capabilities. Given a problem to be solved, these agents collaborate and negotiate with each other regarding exploitation of their individual capabilities. The negotiations compare required services with the capabilities of the agents and resources represented by the agents and, subject to a stated quality of service (QoS), arrive at a solution plan for the given problem. The plan is then executed by the agents and underlying resources. Thus, problem solving by community collaboration is achieved through delegation of functions to a community of agents that act on behalf of the community of users.

To the end user, the agents and their capabilities are presented as Virtual Entities (analogous to 'virtual research assistants') with specific function profiles. The user is provided with a virtual workspace for organizing the agents and working with them (such as adding or removing capabilities to them, and monitoring their participation in certain problem solving exercises). In this workspace, the user may define problems and monitor their progress, maintain a repository of methods or processes for solving certain domain problems (for reuse across the community) and so on.

Logical Architecture

Figure 1:
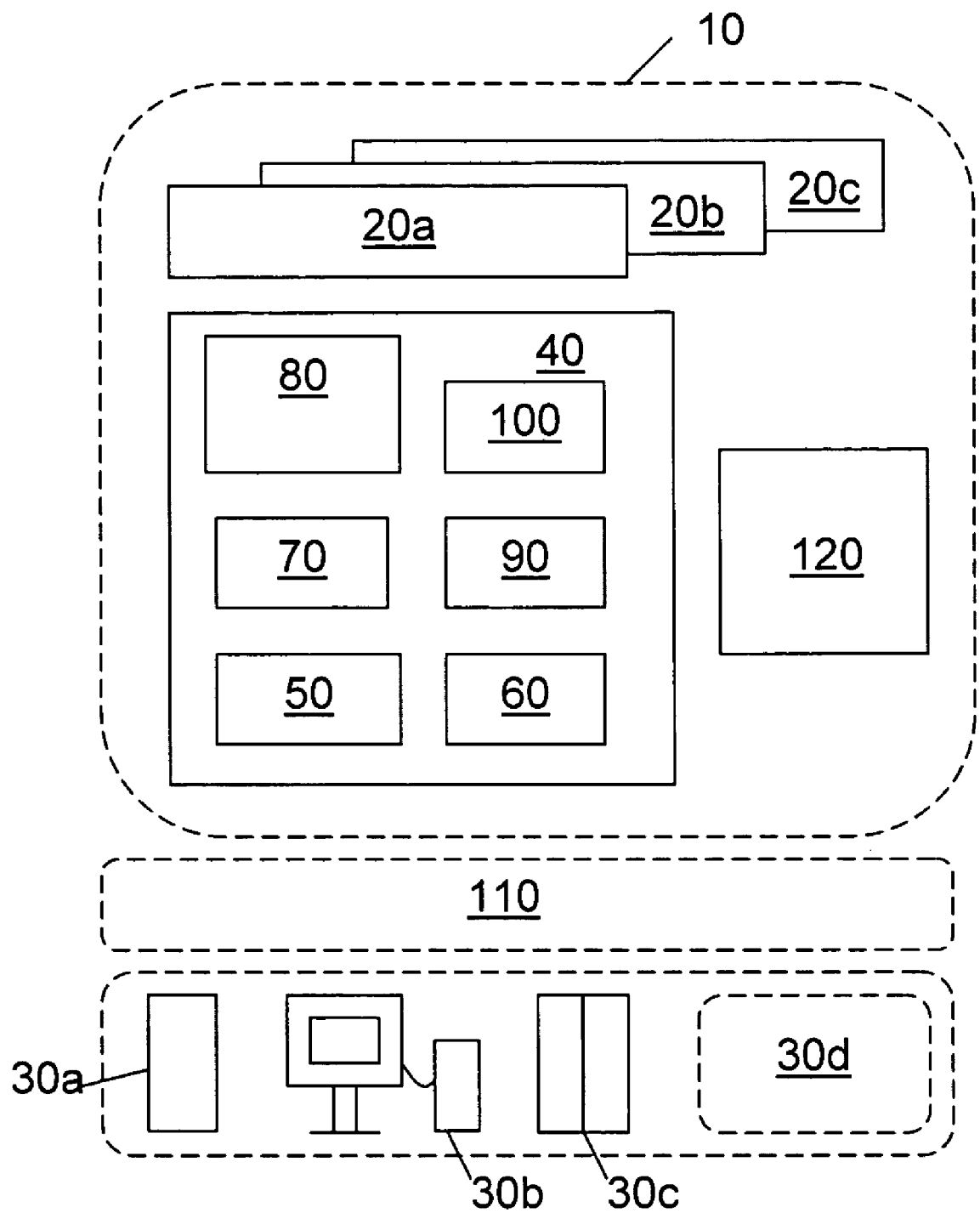
FIG. 1 shows a collaborative problem solving environment (CPSE) according to an embodiment of the invention.

The components of the infrastructure combine to provide a Collaborative Problem Solving Environment that is built on a wide area network of shared, distributed and virtualized capabilities including services provided by software tools and applications, platforms (hardware, middleware and operating systems) and problem solving methods and knowledge. Although referred to herein as a 'Grid' of distributed capabilities, the network is not strictly limited to the Grid Computing protocols and standards. The infrastructure supports standard representation (definitions) formats for representing capabilities, registries that assist in the dynamic discovery of entities within the network having the required capabilities, and mechanisms that enable the dynamic binding and invocation of the discovered entities. FIG. 1 shows some of the components of the Collaborative Problem Solving Environment architecture.

The Collaborative Problem Solving Environment (CPSE) 10 includes software entities ('Virtual Entities') 20 that may be created and owned by the end-users (domain experts). The Virtual Entities (VE's) encapsulate data and methods for performing certain tasks and provide a virtual representation of services provided by underlying computing resources 30.

The end-user can equip these Virtual Entities with capabilities that either map to tools, applications or apparatus 30 deployed on the Grid or map to knowledge of a problem solving method. Core functions required for problem solving are encapsulated within a Virtual Entity Platform (VEP) 40 while each Virtual Entity (VE) encapsulates the mechanisms to organize and access the tools, applications and the methods aggregated by the particular Virtual Entity. The VE's and VEP's (described in more below) provide access to the services of the underlying resources via communication services 110 such as RMI, Web services, CORBA or TCP/IP. FIG. 1 illustrates the layers in the architecture. Some example responsibilities of each layer are described below.

The CPSE and its network environment have the following features and characteristics:

The Grid is characterized by the capabilities that it possesses. These capabilities are generally provided by the tools and applications 30 (or services) installed on the various Grid Nodes (network-connected data processing apparatus). Some Virtual Entities extend the capabilities of the Grid, adding functions (additional capabilities) on top of the services of underlying resources in addition to providing access to the underlying resources.

A Virtual Entity (VE) 20 is a software component that aggregates a set of abstract representations of capabilities, for ease of interaction with corresponding VE methods and underlying tools and applications. A VE can be considered analogous to a person with capabilities (skills and knowledge) that the person can put to use while performing specific tasks. The Virtual Entities may interact with the external world to learn and acquire new capabilities in the form of knowledge of methods to perform certain tasks (referred to hereafter as Recipes).

The Virtual Entities are supported by a Virtual Entity Platform 40. The CPSE solves problems through planning and plan-execution. A Planning component (plan building engine) 50 of the VEP accepts a Problem Definition, interprets the same and collaboratively creates a Plan Document that includes the series of activities that have to be performed to accomplish the goal. Then the Virtual Entity community cooperatively performs each of these activities based on the capabilities possessed by each Virtual Entity and its capacity to honor a stated QoS. The generated Plan Document is used by the Plan Execution Engine 60 for orchestration.

The Planning Component 50 creates a Plan Document dynamically, based on the Capabilities available in the CPSE (at any point in time), which could be in the form of Recipe-for-Action and/or applications or services deployed on the Grid. The Planning Component uses means-end reasoning, to generate a complete recipe and hence the plan. For example, in order to achieve a certain goal the planning component would involve the VEs in deriving a method to reach the goal (a desired end state) from the current state by matching the inputs & outputs (type, constraints, etc). Based on the degree of precision that goes into each matching operation, there is an overall provenance score that is associated with the evolved Plan Document. If the resultant Plan Document has a low provenance score, the Plan Execution Engine can seek user approval of the plan before execution.

The Planning and Plan-Execution components 50, 60 are implemented as functions of the Virtual Entity Platform 40. In addition, to enable collaboration between the Virtual Entities in a given problem-solving scenario, the Virtual Entity Platform provides basic supports such as Messaging 90, distributed Virtualized Information Repositories 80, a BlackBoard 70, and VE management services 100.

The resulting environment comprises Virtual Entities 20 with capabilities corresponding to the methods they contain and services offered by underlying resources 30 (tools, applications or services) on the Grid, together with capabilities acquired from subject matter experts in the form of Recipes. The environment can function effectively as a Collaborative Problem-Solving Environment (CPSE).

More details about the various components in CPSE are described in subsequent sections of this document.

Deployment Architecture

A CPSE is a continuously evolving environment, in terms of its size (number of capabilities, knowledge, etc) and complexity. The CPSE includes the following components that are distributed across the various Grid Nodes:

Virtual Entity (VE) 20—An Agent that aggregates capabilities available on the Grid and participates actively in problem-solving scenarios during planning and plan-execution.

Virtual Entity Platform (VEP) 40—A Platform that hosts all the VEs. In addition to VE Management Services 100, the VEP supports other infrastructure services as follows:

Messaging 90

Virtualized Information Repositories (IR) 80, including a local service registry Dictionary—This component holds terms that are used in a problem-solving scenario.

Black Board 70—This component is used by the VEs in the CPSE to advertise their requirements and other VEs send their bids against these advertisements. This component is also used by the VEs for negotiations in a problem solving scenario.

Global Service Registry (GSR) 120—A registry of all the services available in the CPSE. The GSR may be implemented as a centralized registry running on a single node or as a federation of sub-registries stored on multiple nodes.

Figure 2:
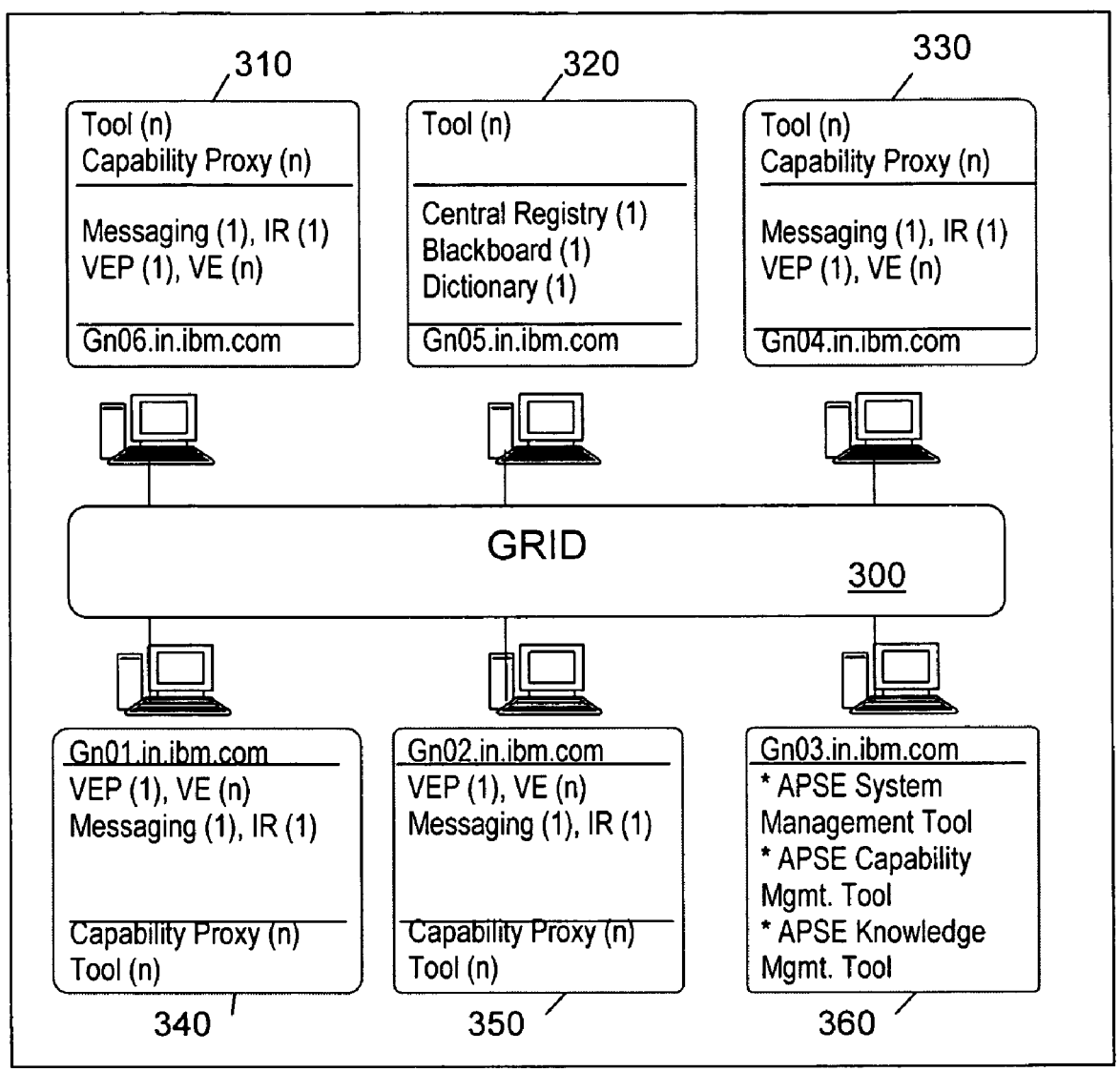
FIG. 2 shows an example CPSE deployment according to an embodiment of the invention.

A typical deployment scenario is illustrated in FIG. 2.

Every Grid Node in the CPSE has one Virtual Entity Platform 40 (VEP), which hosts:

At least one and typically many Virtual Entities 20 (depicted as VE (n), where n denotes 'one or many')

one Messaging component 90 (for the VE's, VEP's and the other components to communicate with each other)

one Information Repository component 80 (which manages the documents or other files and provides a virtualized access to these documents spread across the various VEPs)

The CPSE also has:

one Global Service Registry (GSR) 120—a focal point for common information and connections to other local registries hosted in the various VEPs one Dictionary component (to ensure a common medium of communication among the VEs and VEPs)

one instance of Black board 70 (for collaboration between VE's during planning and for information exchange between VE's for other scenarios)

The GSR, Dictionary and the Black board components can be hosted in any node in the Grid. In addition, a Portal Server is also setup on a node in the Grid to provide end-users with Web access to the CPSE.

CPSE Components

The components that make up the collaborative problem solving environment, their responsibilities and the interactions between the components, are described below. Applications within the service-oriented CPSE architecture are not built as a tightly coupled monolithic whole. Rather, applications are composed dynamically from the deployed and available services in the network. The services used in the composition of an application are dynamically discovered and bound together in a loosely coupled manner. This dynamic construction allows the system to respond more quickly to new business requirements.

In the above statement, the 'Applications' map to Problems that are being solved on the Grid and the 'Services' map to Capabilities in CPSE. These are dynamically discovered and bound together through autonomous planning and plan-execution components of CPSE.

Structural Model

Figure 3:
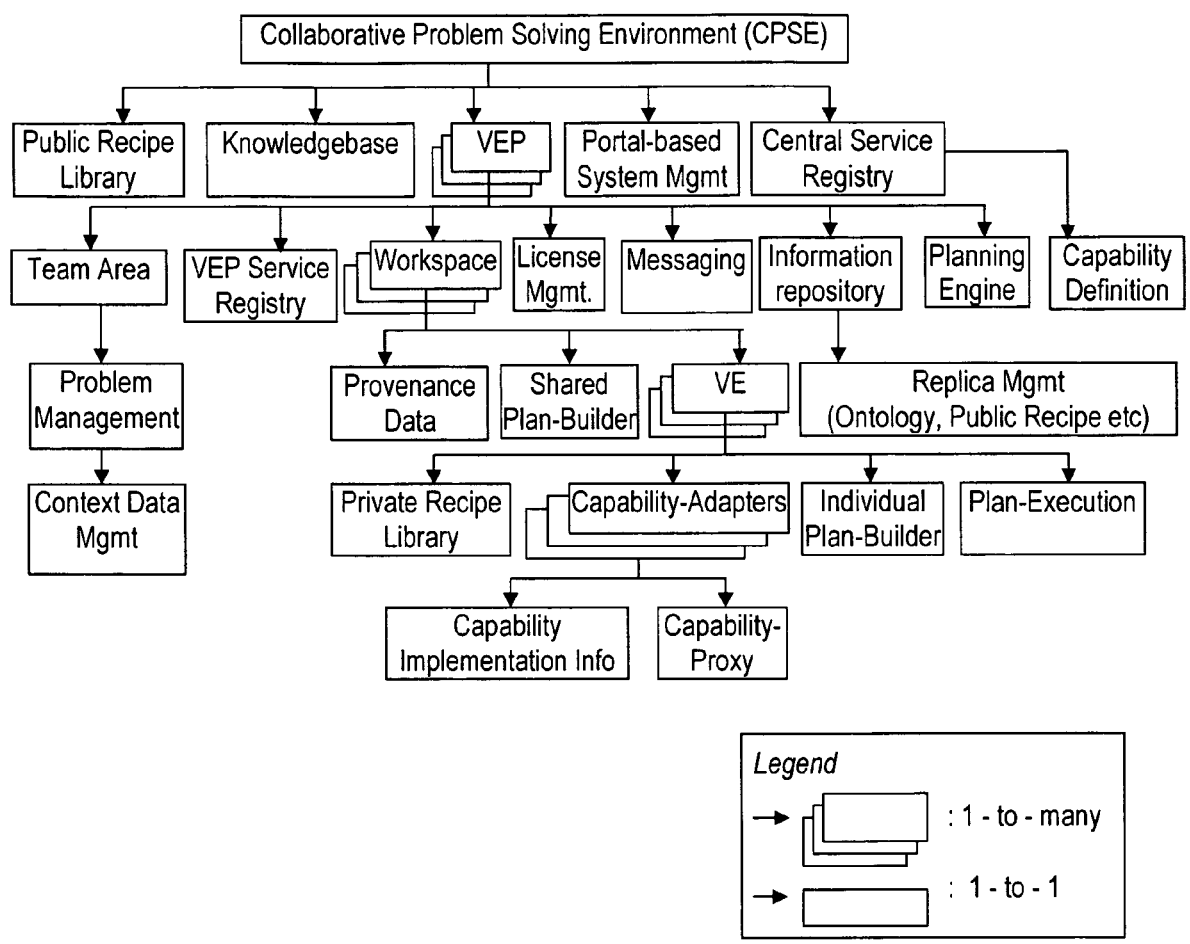
FIG. 3 shows components of the CPSE and their structural assembly, according to an embodiment of the invention.
Figure 4:
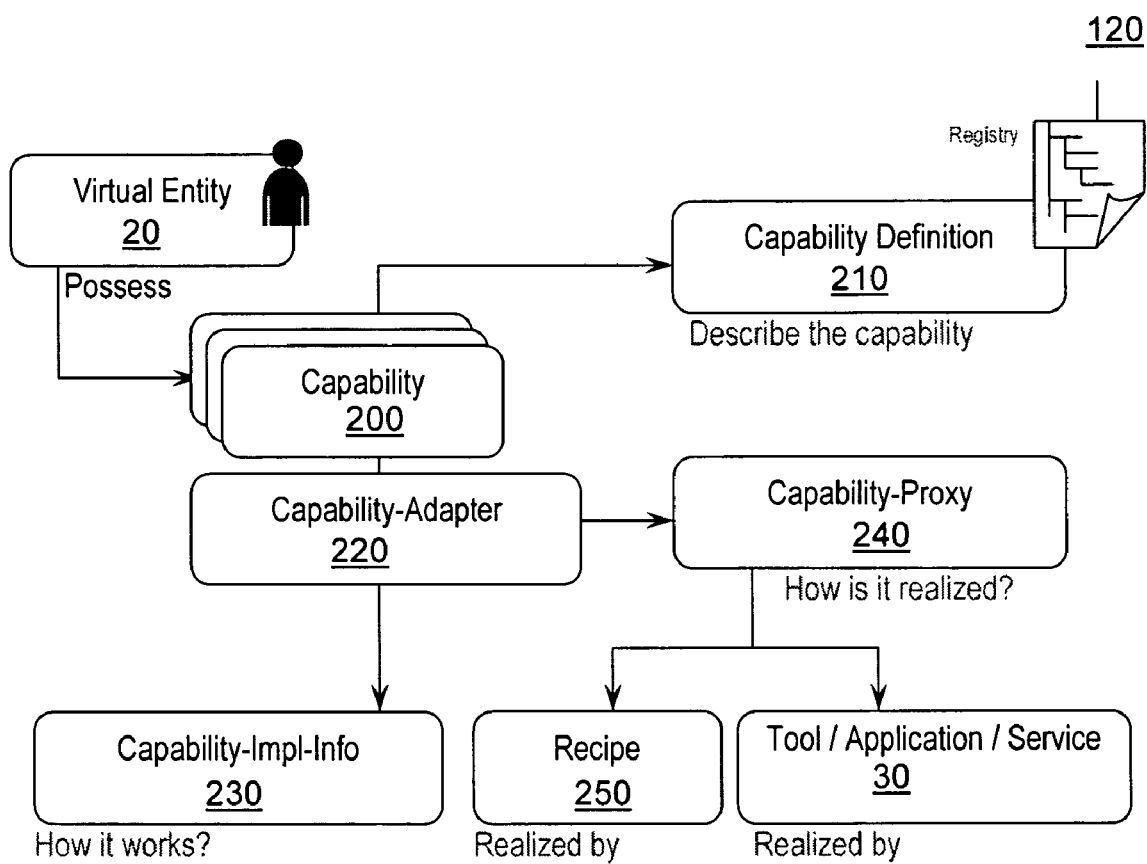
FIG. 4 shows the relationships between virtual entities, capabilities and related features of an embodiment of the invention.

The components of the CPSE are discussed below with reference to FIG. 3 and the following categories:
  Service Components
    Service Registry
    CPSE Knowledgebase
    Information repository
    Messaging
    Security
  Core Components
    Capability Definition
    Capability-Proxy
    Virtual Entity (VE)
    Virtual Entity Platform (VEP)
    Recipe Management
    Workspace
    System Management
    License Management
  Problem Solving Components
    Plan Building Engine
    Plan-Execution Engine
    Provenance
    Problem Management
    Context Data Management.
    Negotiation The structural assembly of the components is illustrated in FIG. 3, in which arrows indicate relationships between the various components of the type "Component A comprises Components B,C,D".

Service Components

The Service Components provide the foundation services required to facilitate a secure collaborative problem solving environment.

Service Registry

The CPSE architecture revolves around several directories that contain information about the various distributed components in the environment. The following are the various information directories that are distributed across the CPSE.
  Public Service Registry 120—contains information about the topology of the Grid, the VEP topology, Capability definition, User Information, etc. This registry is hosted on one of the nodes in the Grid.
  Private Service Registry 80 (shown as VEP service registry in FIG. 3)—instances of which are maintained by every VEP and VE to maintain information required for its operations. For example, the VE has a registry for maintaining information about capabilities that are attached to it.

The Service Registry can be implemented over any Directory service such as LDAP or could leverage from the services of the underlying service containers such as OGSI.

CPSE Knowledgebase

The Knowledgebase of CPSE provides a common grammar for problem definition, recipe elaborations, collaboration and negotiations during problem solving exercises. This can be categorized as follows:
  CPSE Common Ontology—is a context independent Ontology that in its basic form consists of a dictionary of terms used in the CPSE. The CPSE recognizes these terms in a problem definition, and in its problem-solving discourses.
  CPSE Context Ontology—is a context specific ontology that is specific to the problem-solving scenario in question. This Ontology defines and uses knowledge elements that are applicable only to the given context.

Physically, there is a single instance of the CPSE Common Ontology present in the system, which is applicable across all problem solving scenarios. CPSE Context Ontology is defined at the time of problem-solving and is shared amongst the participants only. Each of these ontologies typically contain the following:
  Terms—Names of terms which is the subset of the universe which contains all objects of that type.
  Direct-relationship between terms (such as "A is a B" relationship, synonyms, association-relationship).
  Additional rule information that is enforced between one or more related terms.
  Annotations that can be tagged to the terms, relationships and rules, in the ontology.

The information maintained in the Knowledgebase provides a single point of reference for concepts and terms used in CPSE. For example, the planning component in the CPSE uses this information during decision making and negotiations. The Type Hierarchy information (stored as part of the 'A is a B' relationship) is used by the planning component to dynamically match input and output data types to identify suitable Virtual Entities to perform the necessary tasks to achieve the overall goal.

DAML-OIL (DARPA Agent Markup Language—Ontology Interchange Language) is a popular language to represent Ontologies and can be interpreted using engines that support Description Logic Reasoning.

Information Repository

CPSE supports virtualized access to Information through a Distributed Information Repository infrastructure. Every VEP possesses a 'managed data store' that is virtualized by registering it with the Distributed Information Repository. When the VEPs or associated components work with information from this repository, the VEP would be given an impression that all the information is available locally in its 'managed data store', whereas the Distributed Information Repository would have physically distributed the data across the various instances of 'managed data store' in the CPSE.

Organizing Virtual Data Store

If the Information Repository manages file-based data then the Repository can be built on File-based storage systems. This is achieved by using the meta-data (replicated across all the VEPs) to provide virtualized access to information distributed across various nodes. The meta-data includes the following information:
  Context
  Owner
  Author(s)

Access Control List
Date of creation
Date of last update
Access History
Locked/not locked
File name
Server URI
Relative path
Replica Info (replica timestamp, replica locations, sync-errors)

While initializing a Context Hierarchy (CH), the end-user specifies preferences for the target location (Grid Node and relative path). For example, while initializing the root CH, namely [Project], the end-user could state the preference to use Grid Nodes in the ProjectStore domain (which could spread across GNode001.in.ibm.com, GNode005.in.ibm.com) to store Project-related information and $STOREHOME\Project as the default directory. Similarly, the end-user could specify preferences of Nodes and Directory for each and every context under the root context. By default, the information provided for the Root context is inherited by all the sub-contexts. In this example, the context "[Project]\[Experiment]\[Input]" will inherit the same Grid Nodes (ProjectStore domain—GNode001.in.ibm.com, GNode005.in.ibm.com) and $STOREHOME\<Project Id>\<Experiment Id>\<Input Data> as the default directory, where Project Id and Experiment Id refer to the specific instances of Project and Experiments.

Virtualized Data Access Using Context Information

After defining the context type hierarchy, the end-user can now access any information, document or file using the context. For example, <Project Id>/<Experiment Id>/<Input Var-Name> will directly identify a document or file that is used as <Input VarName> in the Experiment identified by <Experiment Id> in Project <Project Id>. In order to achieve this, the various Contextual variables or 'Context Instances', are bound to the Context Type. While binding the Context Instances to the Context Type of the CH, the end-user can specify the filename for the document or file.

Messaginq & Message Formats

Given the distributed nature of the CPSE, messaging is a significant component for effective collaboration of the CPSE components. Every instance of the VEP has an underlying messaging infrastructure that facilitates communication between the various CPSE components such as Virtual Entities, Blackboard, and Information Repository etc. Since the CPSE provides a dynamic environment into which component instances enter and leave (for example virtual entities, instances of VEP) it is preferred that the messaging infrastructure operates in a publish-subscribe mode. Thus interested entities could register with the messaging infrastructure for being notified about specific messages or message categories or messages related to specific contexts. A number of suitable publish-subscribe messaging middleware products are commercially available, including the WebSphere™ MQ Integrator products from IBM Corporation.

The communication language adopted between two entities in the CPSE could depend on the category to which they belong and the functions that they perform. For example, the virtual entities (agents) may communicate using FIPA compliant Agent Communication Language. In general, XML is the preferred format for the messages exchanged between the components of the CPSE.

Security

A security component ensures that the resources of the community are legitimately used in a controlled manner. Here again, the model adopted is backed by the principle of decentralization of control. This is achieved by distributing the security function across the environment under the cover of the VEP instances while the security data such as Access Control Lists is controlled by the individual resources themselves.

Resource Identity and Access Control Lists

Each and every Resource in CPSE holds its own Access Control List (ACL) and every user possesses a Digital Certificate, which can be authenticated and authorized by the security component in the VEP against the accessed resource's ACL. Since the CPSE comprises autonomous entities (such as the Virtual Entity that acts on behalf of users), these entities also possess a Digital Certificate (which is cross-certified by its owner) of their own to enable them to authenticate and authorize themselves across the environment. The ACL present with these entities is used to ensure secure access to these entities.

Access Control for Resources

The owner of a resource is, by default, provided with 'Manager-level' access control for the Resource, at the time of creation. The other access level considered for the resources are illustrated in the table below. Each resource type (representing a collection of resources) and resource instance holds its own ACL, and this ACL can be viewed by the VEPs that are given reader access to the ACLs by default, to perform the CPSE's security function.

| Access Level | Privileges | Additional Comments |
|---|---|---|
| Manager | Can modify ACL settings, encrypt a data for local security, modify replication settings, and delete the resource - tasks permitted by no other access level. Managers can also perform all tasks allowed by other access levels. | A Resource must have at least one Manager. |
| Designer | Can modify the design of the Resource Type (like Recipe Template, Document Template etc.). Designers can also perform all tasks allowed by lower access levels. | Applicable only to Template Objects (core Resource Types), based on which the other resources are instantiated in the CPSE. Typically, the original designer of the resource or to a person responsible for updating the design after the resource is in use. |

-continued

| Access Level | Privileges | Additional Comments |
| --- | --- | --- |
| Editor | Can edit the Resource Instance. For a Resource Type (collection) - Can create and edit all entries, including those created by others. | Applicable to Collections like Recipe Library, Capability Definition etc. and other resources. In case of Resource Type, this level is typically assigned to a user, who is responsible for maintaining all data in the collection. |
| Author | Can edit the Resource Instance. For a Resource Type (collection) - Can create entries in the collection and can edit only those entries authored by self. | Applicable to Collections like Recipe Library, Capability Definition etc. and other resources. In case of Resource Type, this level is typically assigned to a user, who is contribute to the collection but not edit entries created by others. |
| Operator | Can execute the resource (Resource Type/Resource Instance) | Applicable only to those resources that are executable (like Capability Adapters) |
| Reader | Can read information from the resource (Resource Type/Resource Instance) | Applicable to those resources that can provide information. |
| Depositor | For a collection-type resource - Can create an entry but can't read any info. | Can be used by components that need anonymous inputs like ballot box. |
| No access | Cannot access the resource. | |

A user may belong to multiple groups and hence has multiple level of access (for example, Author and Reader access) to the same resource. When the user accesses the resource, the user will be provided the highest level of access that is possible (in the example, the user will operate with Author-level access).

Core Components

The core components are instrumental in providing the basic building blocks and behavior for facilitating collaboration and problem solving. These components provide their functions over those offered by the Service Components. The following description of components and their relationships refers to FIGS. 1, 4, 5 and 6.

Virtual Entity Platform (VEP)

The VEP component 40 is the home for components that together provide and manage the problem solving infrastructure. Instances of the VEP are distributed across the environment, with typically one VEP instance on each Grid node participating in CPSE, and provide the primary interface through which users access the CPSE. To connect to the CPSE, the user first logs on to a VEP instance. The VEP instances, each of which has a unique identity in the environment, are able to collaborate with each other over network connections and to virtualize the services of the CPSE.

Workspace

CPSE is a multi-user environment and each user is assigned a workspace to enable service-provider and service-requestor end-users (including domain experts) to define, organize and control artifacts and operations in the CPSE. The Workspace holds user-specific information such as the Virtual Entities, problems and experiment data, history of problems solved by the user using the CPSE, confidence in other Virtual Entities, and confidence in Recipes depending on past performance.

Virtual Entity (VE)

Figure 6:
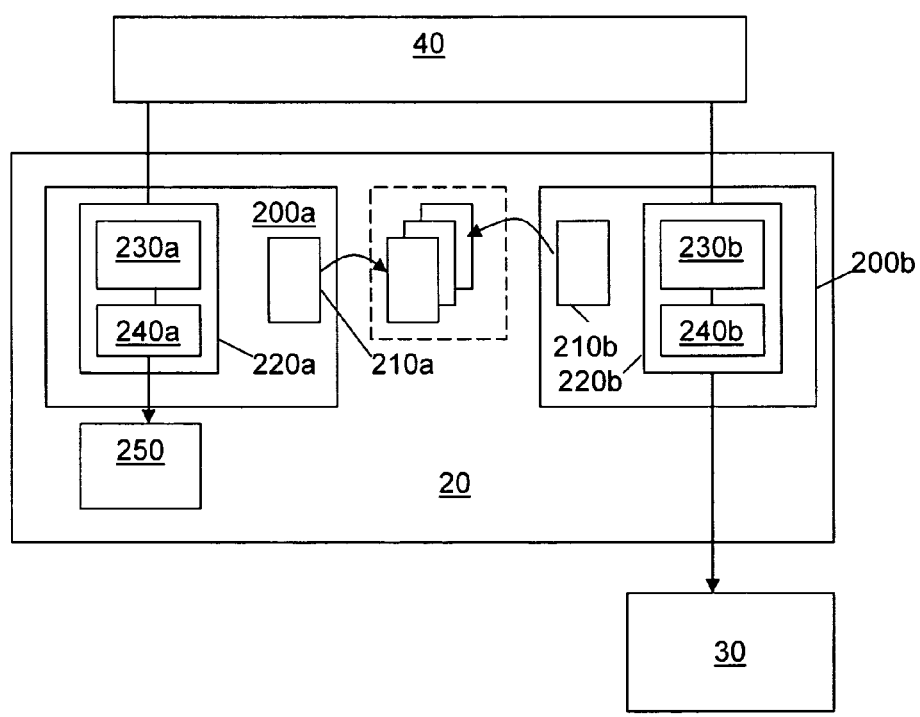
FIG. 6 shows the structure of the Virtual Entity of FIG. 5 in more detail.

The Virtual Entity abstraction is the closest to an end user. Through this abstraction, the end user is able to participate in the CPSE either as a resource owner or as a consumer of community resources and knowledge. The architecture of a VE 20 is shown in FIG. 6. Relationships between components of a VE and the use of capability representations are described with reference to FIG. 4.

Every user creates and personalizes at least one Virtual Entity 20, profiling the VE's with capabilities 200 (resources and knowledge) that enable their active participation and contribution in problem solving exercises. Since they are modelled as agents, the Virtual Entities functionality extends beyond that of a simple object with defined behaviour. The Virtual Entities act autonomously on behalf of their owners, planning solutions for problems and collaborating with peer Virtual Entities towards planning a solution subject to stated constraints (QoS), and periodically providing status updates to the owner. The collaboration and planning relies on support services of the Virtual Entity Platform 40.

Capability Definitions

Figure 5:
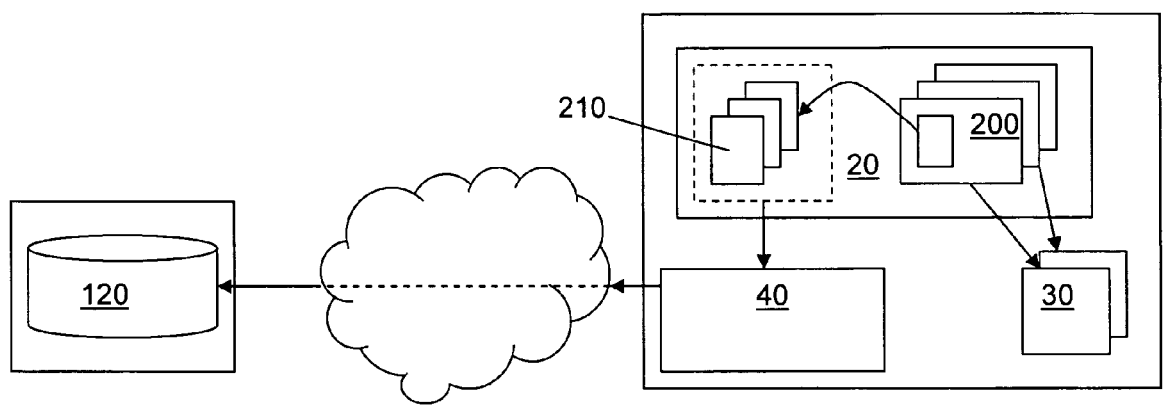
FIG. 5 shows components of a CPSE implementation on a Grid node, including a Virtual Entity Platform and Virtual Entities publishing their capability definitions to a remote registry.

Referring to FIGS. 5 and 6, a Capability Definition 210 (similar to a WSDL in Web Services) is a description of a capability 200 of a Virtual Entity 20. Capability Definitions 210 provide a concise description of the capability 200 in terms of its properties in an unambiguous, standard and computer-interpretable form. Capability Definitions are used to characterize the capability for purposes such as advertisement, discovery, and selection. The Capability Definitions are published in a registry 120, discovered by other VE's using various tools, and selected using matchmaking techniques. There is a single shared-access registry 120 of Capability Definitions maintained in the CPSE (in addition to private registries), thereby ensuring a common-understanding amongst participants in the CPSE. The information available in the Capability Definition Registry 120 is also used by the Virtual Entity during the planning stages of a problem-solving exercise. Several VE's may publish identical capability definitions—corresponding to either similar or identical capability implementations as explained below.

Some of the fields comprising a Capability Definition are:
Capability Name—the name of the capability being defined
Capability Version—the version of this definition
Textual Description—a description of the service that is represented by the capability definition Contact Information—information pertaining to human contacts related to a definition Input data—input data denoted by their respective data types, which implementations of a capability definition can expect to be fed in by the consumer Output data—output data denoted by their respective data types, which implementations of a capability definition are expected to produce Preconditions—preconditions to be met for using this capability QoS—the QoS parameters which different implementations can provide values for serviceParameters—additional information that implementers of a capability definition would like to state as key-value pairs Capability Adapters (Capability Implementations)

Given a particular Capability Definition 210, different VEs 20 in the environment may provide varied implementations. While the Virtual Entities 20 use Capability Definitions 210 to publicize and collaborate over their abilities, they bind to implementations (the tools, applications and services 30) for each of their capabilities through Capability Adapters 220 as shown in FIG. 6.

A Capability Adapter 220 is composed of two parts—the Capability Implementation Information 230 that describes the binding and underlying functions, and the Capability Proxy 240 that encapsulates the binding function.

The Capability Implementation Info 230 typically contains information that is useful for matching a specific implementation of a capability in fitting a solution for a given problem. For example the implementation info will include details such as:

Implements (reference to the Capability Definition 210 that is implemented), realized By (a specified Recipe 250 within the VE or an underlying resource such as a software tool 30), Binding Protocol (such as SOAP, GRAM, RMI/IIOP), inputParameter (subType of a ParameterType and additional inputConstraints, for example GeneSequence in FASTA format with sequenceLength<5000 characters), outputParameter (subType of a ParameterType, additional outputConstraints), preconditions (additional preconditions that must be satisfied for the Capability Binding to be effective), and Quality Guarantees (described in terms of [serviceParameterName, sparameter], servicecategory as explained above).

The Capability Proxy 240 encapsulates the details of binding to the end implementations of a capability, which could be based on different platforms or technologies. The Capability Proxy 240 typically encapsulates implementations of connectors to these capability implementations. Thus any tool or application 30 (including legacy ones) can be plugged into the CPSE, immaterial of the heterogeneity of the tool's hosting environment or technology, by developing an appropriate Proxy Object 240 that encapsulates the platform specific interaction details with the end tool or application 30.

To arm a Virtual Entity with an implementation of a specific capability, a Capability Adapter 220 that encapsulates the Capability Implementation Info 230 and Capability Proxy 240 is created and linked into the Virtual Entity 20 in association with the respective capability.

Figure 7:
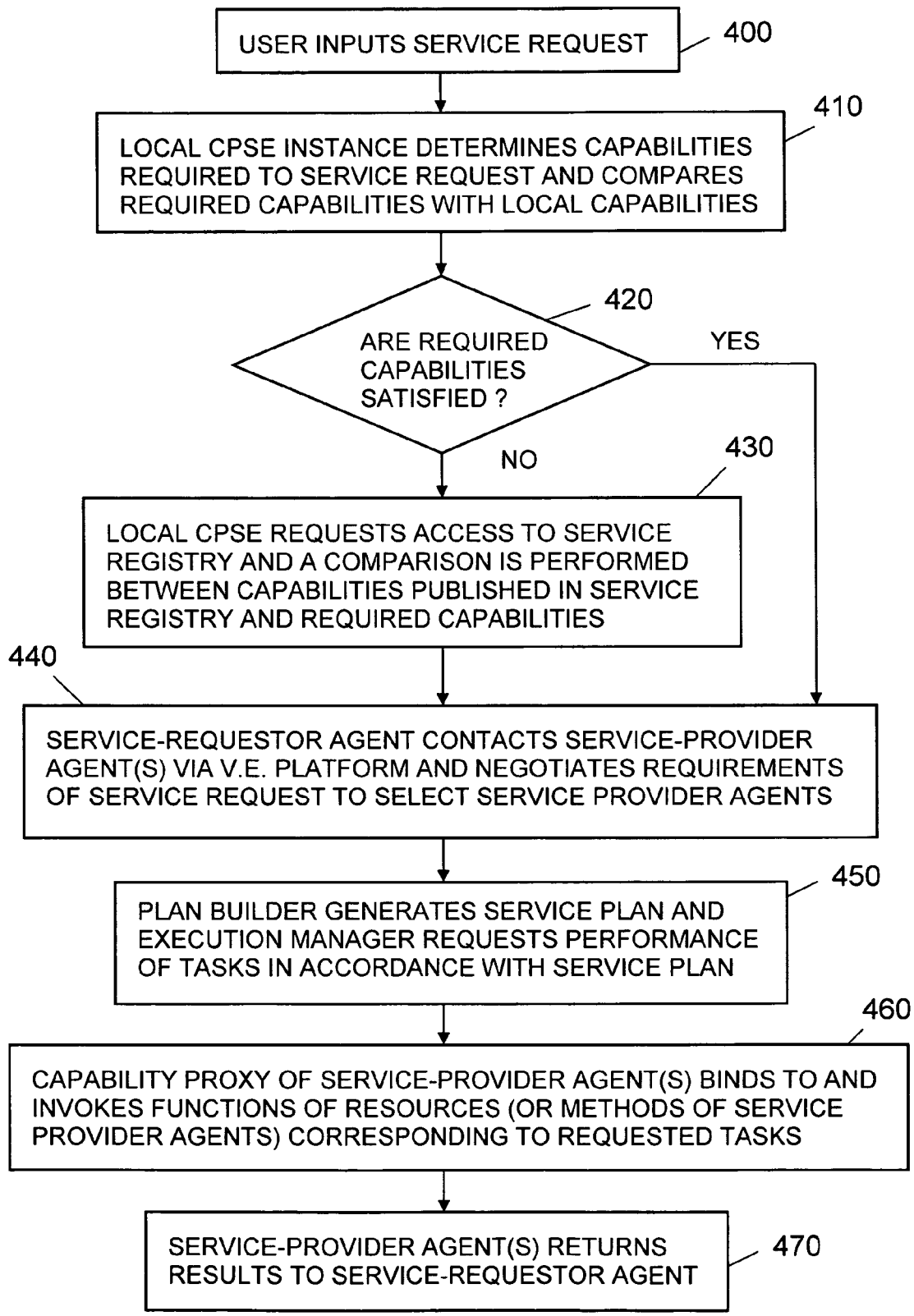
FIG. 7 is a schematic representation of a sequence of method steps according to an embodiment of the invention.

FIG. 7 shows a sequence of steps of a problem solving method, implemented in CPSE according to an embodiment of the invention. When a CPSE user interacts with their CPSE workspace to input 400 a problem, CPSE ensures 410 that the problem is defined in terms recognizable as a set of definitions of capabilities required to perform sub-tasks to solve the problem. The set of required capability definitions corresponding to the input problem is then compared 410 with capabilities that are available locally and with a local cache of identifications of remote capabilities (cached following a previous iteration of the CPSE flow). If the required capabilities are all available locally (as determined at step 420), the method progresses to the negotiation step 440 as described below.

If required capabilities are not available locally, a comparison is performed 430 between required capabilities and published capability definitions in the Service Registry 120. This comparison identifies remote service provider agents (Virtual Entities) that have associated capabilities matching required capabilities.

A negotiation is then performed 440 between a Virtual Entity 20 at the service-requestor system and the identified service provider agents 20 to determine which identified service provider agents can satisfy all requirements of each sub-task of the input problem. The negotiation is performed with reference to the capability implementation information 230 of each identified service provider agent to identify a best match. A service plan is generated 450 based on this negotiation. A capability proxy object 240 within each selected service provider agent is then used 460 to dynamically bind to and invoke required functions, and results of this processing are returned 470 to the Virtual Entity of the requestor end user. The bound functions may be methods implemented by the service provider agents or functions of underlying resources represented by capabilities of the service provider agents.

In summary, during a problem-solving exercise, a Virtual Entity's profile is understood in terms of the Capability Definitions 210 that it exhibits as its abilities. Next the information encapsulated in the Capability Implementation Info 230 is used for negotiations and for matching a specific requirement. Finally, to execute a matched capability in a Virtual Entity, the Capability Proxy 240 is used—passing all relevant inputs and destinations for expected outputs.

Capability Adapters 220 provide a mechanism by which the CPSE's set of associated tools, methods and applications can be continuously and dynamically enhanced as new capabilities are introduced into the environment. The new capabilities are seamlessly used in formulating and executing solutions to domain problems.

Recipe Management

A Recipe 250 is a knowledge element in the CPSE that captures a method to achieve a goal. The method for solving a problem can be captured using:

Any of the process ontologies in description logic semantics (such as OWL-S) and/or Any flow language syntax (such as BPEL)

From one perspective, a Recipe 250 can also provide one possible realization of a Capability Definition 210. The Capability-Implementation-Info 230 of the Capability Adapter 220 describes the inputParameter, outputParameter, preconditions and Quality Guarantees provided by the Recipe 250.

A Recipe can be described in two forms produces a data transformation from a set of inputs to a set of outputs.

produces a transition from one state to another and this transition is described by the preconditions and effects.

A Recipe can be composed of Capabilities that are

Atomic and have a direct implementation mapping to respective software tools 30.

Simple, but are composed of other atomic capabilities and bound together through a flow definition.

Composite—composed of capabilities that expand to several simple and composite Recipes.

The composition of the Recipe can be described using control constructs such as SEQUENCE and IF-THEN-ELSE. Such compositions not only describe the control flow, but also the data flow between the various capabilities. The Control flow constructs supported by a Recipe Definition Language are Sequence, Split, Split+Join, Choice, Unordered, Condition, If-Then-Else, Iterate, Repeat-While, and Repeat-Until.

Private Recipe Library. A Recipe may be a licensable item (assuming the owner of this item has all the Intellectual Property Rights required to license this item). Public Recipes are available for all the VEs and can be used by any one of them in a problem-solving scenario. Private Recipes are used by the VE that owns them, in a problem-solving scenario; the VE can charge the consumer of the Capability depending on the license policies and economic model setup in the CPSE. More details about the Licensing and Economic models are explained below in relation to the License Management component.

---

Sequence: A list of recipe-steps to be executed in order, which could either be another capability (atomic, simple and/or composite) or control constructs.
Split: The components of a Split are a bag of recipe-steps to be executed concurrently.
Split+Join: This consists of concurrent execution of a bunch of recipe-steps with barrier synchronization.
Unordered: Allows the recipe-steps (specified as a bag) to be executed in some unspecified order, or concurrently. All steps must be executed. As with Split+Join, completion of all components is required. Note that, while the unordered construct itself gives no constraints on the order of execution, nevertheless, in some cases, there may be constraints associated with subcomponents, which must be respected.
Examples:
1. If all recipe-steps are atomic, any ordering is permitted. For instance, (Unordered a b)could result in the execution of a followed by b, or b followed by a.
2. Let a, b, c, and d be atomic, and X, Y, and Z be composite recipes:
3. X = (Sequence a b)
4. Y = (Sequence c d)
5. Z = (Unordered A B)
Z, then, translates to the following partial ordering:
{(a;b), (c;d)}
where ';' means "executes before", and the possible execution sequences (total orders) include
{(a;b;c;d), (a;c;b;d), (a;c;d;b), (a;c;d;b),
 (c;d;a;b), (c;a;d;b), (c;a;b;d)}
Choice: it is a control construct with additional properties chosen and chooseFrom. These properties can be used both for capabilities and execution control (e.g., choose from chooseFrom and do chosen in sequence, or choose from chooseFrom and do chosen in parallel) as well for constructing new subclasses like "choose at least n from m", "choose exactly n from m", "choose at most n from m", and so on.
If-Then-Else: The IF-THEN-ELSE class is a control construct that has properties ifCondition, then and else holding different aspects of the IF-THEN-ELSE. Its semantics is intended as "Test If-condition; if True do Then, if False do Else." (Note that the class CONDITION, which is a placeholder for further work, will be defined as a class of logical expressions.)
Iterate: ITERATE is a control construct whose next Step property has the same value as the current recipe-steps. REPEAT is defined as a synonym of the ITERATE class. The repeat/iterate process makes no assumption about how many iterations are made or when to initiate, terminate, or resume. The initiation, termination or maintenance condition could be specified with a whileCondition or an untilCondition as below.
Repeat-Until: The REPEAT-UNTIL class is similar to the REPEAT-WHILE class in that it specializes the IF-THEN-ELSE class where the ifCondition is the same as the untilCondition and different from the REPEAT-WHILE class in that the else (compared to then) property is the repeated recipe-steps. Thus, the recipe-steps repeats until the untilCondition becomes true.

---

During a problem-solving exercise, a Recipe could be picked up as a chosen method for a solution. The activities or capabilities specified in the Recipe are bound to concrete implementations dynamically, subject to stated constraints. Another feature of a Recipe is the ability to describe the Data Flows: where the input parameters and output parameters have to be matched for ontologically compatible data types, matching output constraints with input preconditions, and overall Quality Guarantees. In case there is a mismatch, the plan engine can take an alternative course of action, to create a sub-goal that ensures that the input parameters and output parameters match.

There are two recipe management components maintained in the CPSE—(a) Public Recipe Library and (b) each VE's License Management Every Licensable Item is recorded in the License Management Database. In conjunction with the Security Component, this component ensures that the Intellectual Property Rights of users are well protected. While declaring a Licensable Item (such as a Recipe, or a Capability-Adapter), the owner of this item can specify the policies for licensing. Licensing can be done using one of the following models Evaluation model—Enables activation of the 'licensable item' a limited number of times for evaluation purposes only or for a limited period for evaluation purposes only.

Subscription model—Enables activation of the 'licensable item' for a limited period of subscription.

Pay-per-use/Rental model—Enables charging for a specific 'licensable item' and its activations. The process typically proceeds as follows: assign a number of activations at the time of buying the license, decrement the count every time the 'licensable item' is used, when the number of activations reaches zero disable the 'licensable item'.

Concurrent Users Model—Enables activation only by a pre-determined number of users at any point in time. This model can be implemented in conjunction with Rental models.

These models can apply to individual Licensable Items and to groups of Licensable items (or LIGroups). If the owner of the Licensable Item intends to make the Licensable Item available using more than one License Model (for example, if the owner wants the Licensable Item to be available both for Evaluation and Pay-per-use), the Licensable Item must be registered in the License Management Database once for each model (i.e. twice in the above example) under different titles.

In summary, the License Management component is responsible for managing all Licensable Items or LIGroups that are registered to its License Management Database. When an authorized user requests a License, the License Manager will generate a new License Key and update the requestor's License Docket with the new License Key. The requestor can now use this License Key when the License Item has to be activated. The information in the License Key will be updated by the License Manager every time it is used. Appropriate License Model policies are applied by the License Manager when the user uses the License.

The License Management Component will interpret the information stored in the License Docket (in conjunction with the License Policies defined against the Licensable item) and:
a) supply the necessary details during negotiation (for planning, QoS matching) or
b) enforce these policies (or rules) before allowing the Virtual Entity to provide the item.

The License Management component implements the following processes (License Management workflows):
Register a Licensable Item/LIGroup
User Registration
Request for License (new license and/or renewal)
Request for Cancelling License
Order processing and Usage Billing for License
Request to change the status of a License (for example change of License model etc.)
Provisioning a License
License Status request/notification Hence, the License Management component can enable selling and buying Intellectual Properties in the CPSE, on-demand.

Problem Solving Components

These components provide the key problem solving functions and they build upon the functions of the core components.

Planning

The Planning component is used to determine a solution for a given problem. For a given problem, this component typically works out a sequence of steps or actions to be performed to arrive at a solution—adopting any suitable AI Planning algorithms based on the information and knowledge support provided by the Core Components. The following are some well know AI Planning algorithms:

Control Theoretic Approach—Control theory models an agent's environment as a set of continuous variables that can be modeled mathematically. The agent is given a small set of controls to affect its environment and a set of sensors that can be used to monitor the effects of its actions. Control theory provides tools for developing optimal controllers for achieving a desired steady state in the environment. For instance, control theory can be used to continuously adjust the maximum number of processes on a server in order to minimize response time.

Decision Theoretic Approach—Decision theory models an agent's environment in terms of a set of states and a set of actions that can be taken in each state. After each action, there is a reward given to the agent, and a probabilistic transition to a distribution of successor states. In the case of fully observable states and no history dependence, the problem is a Markov Decision Problem (MDP).

Reinforcement Learning—Reinforcement learning provides an alternative method for solving MDPs in which an agent can learn by trial and error, without the need for an explicit state-transition model or prior knowledge about its reward function. Reinforcement learning is appropriate when a complete model of an agent's actions is not available.

Reactive Planning—Reactive planning methods do fast on-line computation of decisions using relatively simple functional mappings from observables to actions. Examples include the subsumption architecture and Reactive Action Packages. Reactive planning is a good choice when planning decisions must be made in real time.

Generative Planning—Generative planning models an agent's state using a simplified predicate calculus. The use of logic makes it possible to reason abstractly about arbitrarily large state spaces. Generative planners intelligently search through the space of all possible action sequences to find a sequence that achieves a desired goal or maximizes the agent's utility. Recent advances in generative planning have made its use practical in many real-world domains. The main advance was the separation of planning into two components, action selection and action scheduling. This separation allowed the expensive task of action scheduling to be performed by the highly-efficient scheduling algorithms developed by the mathematics community. The use of existing scheduling algorithms also made it possible to handle more sophisticated domains with resource bottlenecks, deadlines, and utility functions. As a result of these advances, generative planning has become an attractive option.

Case-Based Planning—Case-based planning uses a library of stored plans or scripts to improve the performance of generative planning. When faced with a new problem, a case-based planner first searches its library for a previous plan that was used to solve a similar problem. If an appropriate plan is found, it is used as a starting point for finding a solution to the current problem. By starting from an existing plan, the planner can bias its search towards parts of its search space that are most likely to contain a solution. Having summarized some of the applicable planning algorithms we now look into the planning requirements in CPSE which are as follows:

Collaborative Planning & Shared Plans—CPSE is a multi-agent system, where individual Virtual Entities are capable of generating an individual plan for the given problem, just by using the capabilities that the respective entity possesses. However, these Virtual Entities have to be equipped with the tools (such as community black board, capability brokers) to collaborate with a community to create a shared plan.

Inputs to planning for a solution to a given problem are the set of available inputs, the expected outputs (or the goal state) that are expected to be achieved, constraint specifications with respect to the quality of output (in terms of response time, precision, budget), repositories of recipes and methods (or stored plan) for solving a particular problem, repository of capability definitions, the environment of co-operative Virtual Entities with varied capability implementations, repository of provenance records with respect to the historical performance of Virtual Entities, and fitness of recipes to specific problem profiles. All the above inputs are provided (or made available) to the Planning Component continuously during the course of a problem solving exercise.

Planning is a continuous activity in the problem solving process since the CPSE is a highly dynamic environment where workloads of Virtual Entities may fluctuate (as a result of their participation in problem solving exercises) and where parts of the basic infrastructure could temporarily fail (for example a sub-net of domain of Virtual Entities may be suddenly disconnected due to a network failure). Similarly, the list of capabilities owned by a Virtual Entity and their availability varies with time. Given the dynamics of the environment, the plan for a solution is frequently revisited and verified for its preparedness for execution. When verifications fail there needs to be replanning done. Replanning is also required when part of a plan under execution is not conforming to stated constraints or diverging from the goal state.

Partial Plans—The planning component could generate a partial plan which can be identified during the verification for completeness and preparedness for execution. The completeness of the plan (shared or individual) is evaluated using a published scoring scheme, and this information is used during negotiations, decision making, and for collaboration with end-users.

Planning in collaboration with User—The planning component relies on the end-user generating optimal and semantically correct plans. As the plan evolves (either shared plan or individual plan), the plan-completeness-score would be used to make the following decisions
1) Go to a larger community for further plan refinement,
2) Go to the end-users for plan ratification. The user could define more constraints or provide more inputs to guide the planning component(s) to converge to an optimal and semantically correct plan.

The planning component for CPSE implements a combination of the principles set out above, given the planning requirements. The planning engine facilitates user-supervised, collaborative, knowledge-based (in the form of recipes or scripts), continuous planning. Thus, generative planning and case-based planning algorithms may fit well.

Concepts Behind Planning in CPSE

Described below in more detail is the function of the Planning Component in CPSE. The concepts around which the planning function revolves are described, followed by an explanation of how planning works in CPSE.

A Problem Definition defines the problem that is to be solved. It comprises inputs, QoS constraints and expected output. Also defined is a context tree for organizing all data related to the problem, in the Information Repository.

The Problem Solving Environment comprises the repository of Capability Definitions, the repository of recipes (public and those private to a VE) and Capability Implementations (Capability Adapters) held by the VEs.

A Team Area is an area where some users and their VEs collaborate in solving problems. The Problem Definition will be submitted to the Problem Management component. The problem definition, constraints and the context can be updated dynamically during the planning stages.

A Capability Broker provides functions enabling a VE to find matching capabilities. Given a capability request with associated constraints, the capability broker in the VE will compare and return results with a score for the degree of match with respect to the requirement.

A Recipe is a recommended, ordered sequence of steps for performing a particular activity or task. Each step in the recipe is a performative.

The Planning activity in the CPSE is performed by a Virtual Entity. At the end of the planning activity a plan is generated.

A Plan is an ordered sequence of steps or actions to be performed to achieve a particular goal or output. Each step in a plan comprises a performative, a performer and QoS constraints. The performative further includes the inputs (variable name, type & source URL—to obtain the value), output (variable name, type and destination URL), constraints (rules and policies) and the capability name. A consistent and complete plan document will contain a clean data-flow between the various steps or actions, and contracts involving the performer for each step.

A Partial Plan is a plan where parts of the plan do not have complete information. There could be one or more steps that may not have a performer or there may not be continuity in the sequence of steps due to the absence of a performative.

A Complete Plan is a plan that has all information required to trigger the execution of the plan.

An Individual Plan is a plan generated by a Virtual Entity instance to solve a problem utilizing only those capabilities (adapters) possessed by it. An individual plan could either be Partial Plan or Complete Plan.

A Shared Plan is a plan that is a composition of several individual plans that must be executed to solve a given problem. A shared plan evolves from the collaboration of a team or community of VEs in problem solving exercise where each VE offers, through an Individual Plan, to contribute to a part of the whole solution. The participating VEs may be owned by the user who has submitted the problem or may belong to other users in the community. The details of the Individual Plan are exposed to the reader depending on the security credentials owned by the reader and the ACL definitions of the Individual Plan. A Complete Shared Plan can be perceived as a tree of nodes where the leaf nodes are Complete Individual Plans and the other nodes are Shared Plans.

The Depth of a Shared Plan is the maximum depth in a shared plan tree (maximum of distances between the root-node and the leaf-node).

A Resource Broker facilitates identification of Virtual Entities that offer a required capability subject to stated QoS constraints. The Resource Broker's brokering scope may be specified to be:
the user's workspace, in which case the broker only considers Virtual Entities belonging to the user
an acquaintance group, in which case the broker transacts with Virtual Entities that belong to the user and to a selected group of other users pre-defined by the user a provenance network, in which case the broker works with a group of Virtual Entities whose performance under similar circumstances has a proven track record public domain, in which the broker considers any Virtual Entity in the entire environment.

To publish the requirement to the Virtual Entities and associate their responses together, the broker uses the service of a Black Board. A capable Virtual Entity typically responds to the Resource Brokers request, through an individual plan.

When assessing the fitness of an Individual plan, the following are the criteria employed by the Resource Broker:

The degree to which the plan is complete.

The degree of confidence with which the plan promises to meet the stated QoS constraints.

Planning Cycle in CPSE

The Planning Cycle includes the following steps:

Generation of a best plan given a specified plan depth and brokering scope

Verification of the plan for completeness and conformance to stated objectives with respected to QoS constraints.

Replanning, if plan verification step concludes the current plan as Partial or not acceptable due to certain non-conformance.

interleaved with plan execution when it is observed that there has been failure or non-convergence to the expected goal, during the execution of the plan.

Before replanning is initiated the user is given an opportunity to direct the replanning process. Here the user may exercise the following options and initiate a replanning:

Alter certain inputs or expected outputs in the Problem Definition

Effect changes in the environment

Increase the Plan depth. When increasing the Plan depth the user may also specify the brokering scope for the Resource Broker which can be User, Acquaintance, Provenance or Public.

At the end of the replanning phase there is again verification and then subsequent replanning if required. Thus the cycle continues till the plan is Complete. At the end of the planning cycle, the team involved in planning will generate a Complete Shared Plan.

Here we explain the various stages in the planning cycle in detail:

A Problem Definition is created by the user and submitted into the Team Area, which will also be available in the user's (participating) workspace. The Team Area broadcasts the problem definition to the user's Virtual Entities specifying a Plan Depth of '1'.

Each Virtual Entity inspects the problem for the given inputs, the expected outputs, the QoS constraints together with elements of the Problem Solving Environment. It then attempts to plan a solution for the given problem by assessing it against its capabilities with the help of the Capability Broker and also assessing its current and projected workload. It then generates an Individual Plan for solving the problem and returns the same.

From among the set of Individual plans returned to the Team Area, a few (partial or complete) Individual Plans are shortlisted with the help of the resource broker (that scores every plan for the extent to which it suits the given problem).

The Virtual Entity that owns the shortlisted Individual Plans are notified to generate Complete Individual Plan. The Virtual Entities would try and generate the Complete Individual Plans by defining the Plan Depth in increments of 1, starting from Plan Depth=1.

The successfully completed plan documents are evaluated and scored by the Resource Broker before finalizing on a single Shared Plan. The user(s)/team members may also be involved in finalizing the Shared Plan.

While generating Complete Individual Plans from Partial Individual Plan, the user could initiate replanning by increasing the Plan Depth (to a value>1), the Virtual Entity will attempt to complete the plan with collaboration from other Virtual Entities. The Resource Broker is employed to search for Virtual Entities (based on the specified brokering scope) that can contribute in fixing the incomplete aspects of the existing plan as identified during the Verification phase of the Planning Cycle.

Plan Execution

Plan Execution is the execution of a plan which, as mentioned earlier, is an ordered sequence of steps to be performed to obtain expected outputs, given inputs and variants in the environment.

Plan Execution, in certain ways is similar to the execution of defined workflows. In this case the flow of work is defined within a Plan.

A Plan is typically executed by a Virtual Entity which owns the plan. Thus in the case of a Shared Plan the plan execution is truly distributed across the environment with each Virtual Entity taking up the execution of the respective Individual Plan owned by it in the Shared Plan.

The execution of a plan can be either sequential or concurrent. In sequential execution each activity or step in the plan is chronologically executed, one after the other, in a sequence. In concurrent execution the Plan Execution component exploits the independence that may exist between certain activities in the plan. In other words, certain activities of the plan that can be executed out of the defined sequence due to their independence on the preceding activities (such as in the case of data flow) are executed concurrently.

The plan execution may be initiated with a Partial Plan where the initial steps of a plan may be crystallized while the remaining parts are being negotiated. In this case the plan execution may start and continue while the planning activity is carried out in parallel towards completing the plan in question.

For every problem the Information Repository designates a virtual data space that is contextually organized as specified in the Problem Definition. All inputs, temporary data and outputs are located in this data space throughout the problem solving exercise.

At the basic level, plan execution is about executing activities in a plan which in turn translates to executing certain capabilities of certain Virtual Entities. A VE that must execute a particular capability is notified with information such as the Contract under which the current request is being made, virtual locations of input data and designated virtual locations for the output data in the Information Repository. The details pertaining to the Capability to be executed and the QoS constraints to be honoured are extracted for the referred contract.

The Virtual Entity executes a capability by invoking the Capability Proxy component of the Capability Adapter that corresponds to the requested capability. Since the Virtual Entity has already committed in contract it is expected that it is well prepared to handle this request for capability execution in terms of initializing the Virtual Data Store for storing temporary data, preparing the relevant resources (hardware and software) and initializing the same.

When initialization is complete, the Virtual Entity is ready to handle the current request. The Virtual Entity de-virtualizes the input, output and temporary data locations into absolute paths accessible over the distributed environment and the data access protocols, passes all of this information to the Capability Proxy and triggers its execution.

The Virtual Entity receives periodic updates on the status of a capability execution from the Capability Adapter. These updates are continuously analysed for their conformance to the plan. In the event of any non-conformance, the Virtual Entity aborts the current execution and initiates a replanning of the activity.

At the end of every capability execution or plan execution the Virtual Entity updates the provenance records with respect to how the execution faired against the actual plan. For example, was there an over-run of constraints, were the expected outputs delivered in the right format and precision, and so on.

The Virtual Entities obtain status of activity execution of the Individual Plans and, in turn, the Shared Plans are also updated to show the current status of the plan with respect to execution.

Industrial Applicability and Advantages

The present invention is applicable to the provision of a collaborative problem solving environment for use in the fields of science, business and healthcare.

An example application of the invention is in the field of medical informatics. 'Medical informatics' deals with the storage, retrieval, sharing, and use of biomedical information and knowledge for problem solving and decision making. This example field of application has been chosen because it exemplifies an area of research and development in which individual domain experts are faced with highly complex problems that, in many cases, can only be solved by collaboration with experts from other domains. How to obtain access to required resources and how to integrate different apparatuses and applications remain major problems for many scientists and clinicians working in the medical informatics field. For example, an important challenge for efficient provision of healthcare is to establish an end-to-end process integration for data flow and control across domains involved in healthcare provision. Improved integration, collaboration and automation are needed in this field to enable provision of better services and solutions for treating suffering and illness and for taking proactive and preventative measures to minimize such problems.

Research in areas such as bio-informatics and drug discovery requires access to multiple tools which may not be compatible with each other. It is often left to the end user to explicitly map the outputs from one application to the inputs of other applications. In complex workflows like those involved in Medical Informatics, there is a need for integration of the tools and services to be done at runtime by the system.

An implementation of the present invention comprises an agent-based infrastructure, providing a uniform layer of abstraction on top of the underlying information technology infrastructure that is already employed across medical informatics and many scientific disciplines. The system supports problem solving and collaboration, resource integration and aggregation as described above. In particular, a collaborative problem solving environment provides of a number of agents and support services that collaborate to achieve a goal.

Described below is an example scenario in the field of Life Sciences, which highlights certain features that may be implemented in a Collaborative Problem Solving Environment (CPSE). The scenario is broken into two parts: capability buildup and job execution. The first part deals with how capabilities are added into the CPSE over a period of time, while the second part runs through a typical job execution in the CPSE paradigm.

Capability Buildup

Let us assume that a computational biology researcher (Reseacher1, in Germany) requires to load gene sequences from a plain text file into a relational database. This is helpful for him to run SQL queries on the sequences that he is currently working on. He writes a program that reads the text file and produces a SQL script that creates the required tables and loads it with the given data. Researcher1 may then provide this Text-to-DB capability to his virtual entity running within a local instance of the problem solving environment (hoping that the new capability will be useful to the community. This is just one example of how capabilities may build-up incrementally across the distributed network.

Let us assume that a second computational biology researcher (Researcher2, in USA) invents and implements a new algorithm for pattern discovery. If Researcher2 (or his CB department) is a part of the CPSE network, Researcher2 may decide to create a virtual entity and give it the capability to generate patterns given a set of biological sequences in FASTA format. This is a second example of incremental buildup of capabilities in the distributed environment.

Now let us assume that a third researcher (Researcher3 in India) is researching data mining. He discovers the new pattern matching algorithm, and devises a new method to cluster gene sequences given the patterns of the gene sequences. Researcher3's organization is a member of the CPSE, so Researcher3 adds this capability to his existing Mining Virtual Entity.

The above examples show just a few examples of how a CPSE may acquire a large number of virtual entities capable of performing a myriad of tasks in the Life Sciences domain. There could be many grids participating in the conglomeration, and a large number of research and commercial organizations. Researchers from member organizations will have given the virtual entities different capabilities and recipes. A recipe tells how to perform a complex task by using the capabilities that are offered by some virtual entity.

Job Execution

Let us assume that Researcher4 obtains a set of 100 gene sequences from her assistant, who conducted experiments on recently arrived specimens. Researcher4 now wants to cluster these sequences and perform some inferences based on the clusters. She opens up her CPSE Workspace on her workstation. She submits a job to the CPSE and specifies the job description as "Cluster the Gene Sequences". She also provides the input text file that her assistant had mailed her. She tells the CPSE (through QoS parameters) that she wants the results as quickly as possible even though they might be a little less accurate. The components of the CPSE then carry out their functions without requiring further user interaction. Researcher4 is not required to consider implementation details of the collaborating agents or Grid topology details, nor to write a workflow or a recipe. This higher level of abstraction can be of significant benefit to users.

The CPSE obtains the job specification and puts up a notice on the virtual blackboard (an example implementation).

Active agents on the network can see the notices on the blackboards. Since the notice asks for clustering of gene sequences, Researcher3's Mining Virtual Entity bids for the job. The Mining Virtual Entity advertises its ability to provide clusters for the gene sequences if the patterns for the same are provided as input. The Mining VE also mentions the time it takes for performing this job, and statistics about previous usage of the capability by others in the community. Meanwhile, other virtual entities capable of performing clustering of gene sequences also bid for the job. Virtual Entity B includes information stating that it requires gene sequences in a proprietary format. Another Virtual Entity C bids for a highly accurate method but takes a lot of time to compute the clusters. The CPSE can be used for dynamic discovery of capabilities.

The Planning module associated with Researcher4's current job looks at the arrived bids, rejecting Virtual Entity C's bid because the bid does not satisfy the QoS requirements. The planning module then puts up a notice on the virtual blackboard that it requires bids for "Generating Patterns from Gene Sequences" and "Converting Gene Sequences in Text Format to the Proprietary Format". Since the agent from Researcher2 bids for the first job, and none bid for the second job, a planning module decides to choose the services of the Researcher3's Virtual Entity. This exemplifies negotiation and dynamic composition of services in accordance with required QoS, and the planning of a solution.

The planning module now has chosen the services of the Mining Virtual Entity and the pattern discovery Virtual Entity. However, a precondition for the pattern discovery Virtual Entity to perform the pattern discovery is that the input gene sequences must be in FASTA format. The planning module identifies the mismatch. The input data specified by Researcher4 is in text format. The planning module uses means-end reasoning to determine that an intermediate goal is to convert the text file into FASTA format. The planning module then publishes a notice on the virtual blackboard saying "Convert gene sequences in text format to FASTA format".

Looking at this notice, a Virtual Agent D bids for the job and wins the bid. Virtual Agent D has a recipe for performing this task. The recipe says that the first step is to convert the gene sequences from text file format into a relational database format and then convert the relational data into FASTA format. However, Virtual Entity D only knows to convert gene sequences from a relational database to FASTA format. So, the planning module of Virtual Entity D sends out a separate request on a virtual blackboard calling for capability "Convert gene sequences in text file to relational format". At this moment, Researcher1's agent running on a grid in Germany bids for the job and wins it. In this way, planning can be implemented by a component within an individual agent.

Virtual Entity D ships the text file that it received from Researcher4's virtual entity to Researcher1's virtual entity. Researcher1's virtual entity processes the text file and produces the SQL script that would create the tables and data. Virtual Entity D then uses this script to load its local DB2 with the gene sequence data provided in the text file. It then runs its algorithm to convert the data in the relational format into FASTA format. The result is returned to Researcher4's virtual entity.

Researcher4's virtual entity then ships the sequences in FASTA format to Researcher2's pattern discovery virtual entity. Researcher2's virtual entity runs the pattern discovery algorithm and creates a file that contains the patterns for the given gene sequences. This is passed on to Researcher3's virtual entity, which then performs clustering of the gene sequences. The resulting clusters are passed back to Reseacher4's virtual entity as output. Reseacher4's virtual entity notifies Researcher4 that her job is complete and pops up a viewer to see the clusters. Researcher4 can use the clusters without needing to know the detailed negotiations and integration of services that has taken place. Collaborative and automated community-based problem solving has been achieved.

As shown in the above example scenarios, the CPSE can be implemented and capabilities added to it to provide a rich problem solving environment that can dynamically compose new intelligent solutions to complex problems. The CPSE offers facilities that no existing workflow or similar system offers. Alternative embodiments may be used to enable improved collaboration, integration, automation or resource management in other multi-discipline, distributed work environments—such as for scientific and medical communities spread across geographical locations or for multi-discipline teams spread between different departments within an organization.

For many fields of science and research including medical informatics, knowledge of and ability to access the work of other experts are important. A recent study performed by the IBM Institute for Business Value suggests that lack of effective people-to-people collaboration is one of the key reasons of non-performance or under-performance of the pharmaceutical industry, which forms an important constituent of medical informatics. The report emphasizes the need for more focus on improving collaboration across traditional boundaries to optimize research and investment and to achieve better results.

For a long time, the medical and healthcare industries have required workers to be dynamic, flexible, capable and adaptive enough to play multiple roles. Communication and collaboration are also required skills. In the newer paradigm of "e-Science", these roles map onto projects that may span across multiple organizations, disciplines and geographies in different time zones. Hence there are issues of how to achieve "effective" communication, collaboration and synchronization among team members. Most contemporary scientific activities are team-based and require extensive synchronization and co-ordination among team members. However, the ever changing dynamics of the scientific experimental setups and the resources being distributed across geographies and organizations (for example, on the Grid) have made it difficult to standardize the means and mechanism for collaboration among team members and publishing of resources such as services and tools for resource sharing.

Medical Informatics require coordination between multiple locations with resources spread across the geographies (often these sites are separated by significant time differences). Embodiments of the present invention provide for publication of services and resources as utilities on a grid, such that all of the resources can be virtually pooled together and presented to collaborators in a composite manner. Tasks can be completed in a convenient and straightforward manner by using the invention for seamless integration of resources. The underlying mechanisms and locations of resources can remain transparent to end users.

What is claimed is:

1. A data processing apparatus comprising:
   a number of data processing units and respective associated data processing storage, such a storage unit being readable by its respective data processing unit;
   a network accessible by the data processing units;
   first computer program functioning as a service-requestor agent operable on at least one of the data processing units for receiving, on the network, a user request for a service;

computer programs functioning as service-provider agents operable on respective ones of the data processing units for accessing a description of the request on the network and having respective capabilities for providing services, wherein the service provider-agents are further operable for performing the steps of:

comparing the requested service with capability descriptions of the respective service-provider agents, wherein the requested service includes a plurality of parts of an entirety of the service and such a service-provider agent determines from the comparing whether the service-provider agent is capable of providing a service for at least one such part;

sending bids to the service-requestor agent by ones of the service-provider agents, wherein such a bid is for one of the service-provider agents to provide, independently of the other service-provider agents, at least one of the parts of the requested service, and wherein the service-requestor agent is further operable for performing the step of comparing the bids to the requested service by the service-requestor agent for determining if the parts included in the bids provide the entire service;

describing a missing part if the parts included in the bids do not provide the entire service;

generating a plan for providing the missing part by at least a certain one of the service-provider agents, wherein the missing part includes a plurality of sub-parts of an entirety of the missing part and wherein the plan includes sub-parts of the missing part allocated among a number of the service-provider agents in a certain task execution sequence; and wherein at least one of the bids received at the receiving step is a bid for less than the entirety of the service.

2. The apparatus of claim 1, wherein the step of generating the plan includes describing at least one of the sub-parts by the certain service-provider agent and receiving bids by ones of the service-provider agents to independently provide the at least one sub-part of the requested service.

3. The apparatus of claim 1, wherein the description of the capabilities of such a service-provider agent includes a description of functions of the service-provider agent and of resources external to, and accessible by, the service-provider agent.

4. The apparatus of claim 1, wherein the service-requestor agent is further operable for performing the step of generating the description of the requested service using capability definitions stored in a storage unit accessible on the network.

5. A computer-implemented method for collaborative problem solving within a data processing network, comprising the steps of:

receiving, by a first computer program functioning as a service-requestor agent on a computer network, a user request for a service;

accessing a service description of the request on the network by a plurality of service-provider agents, each service provider agent of the plurality of service provider agents having respective capability descriptions for providing services;

comparing the requested service with the respective capability descriptions of the plurality of service provider agents, wherein the requested service includes a plurality of parts of an entirety of the service and such a service-provider agent determines from the comparing whether the service-provider agent is capable of providing a service for at least one part of the plurality of parts;

sending a bid to the service-requestor agent only by service-provider agents of the plurality of service provider agents capable of providing at least one part of the plurality of parts of the entirety of the service, wherein such a bid is by the service provider agent independently of the other service-provider agents;

comparing the plurality of bids to the entirety of the requested service by the service-requestor agent to determine whether the parts included in the plurality of bids can be combined to provide the entire-entirety of the service;

describing a missing part by the service-requestor agent if the parts included in the bids do not provide the entire service; and generating a plan for providing the missing part by at least a certain one of the service-provider agents, wherein the missing part includes a plurality of sub-parts of an entirety of the missing part and wherein the plan includes sub-parts of the missing part allocated among a number of the service-provider agents in a certain task execution sequence.

6. The method of claim 5, wherein the step of generating the plan includes describing at least one of the sub-parts by the certain service-provider agent and receiving bids by ones of the service-provider agents to independently provide the at least one sub-part of the requested service.

7. The method of claim 5, wherein the description of the capabilities of such a service provider agent includes a description of functions of the service-provider agent and of resources external to, and accessible by, the service-provider agent.

8. The method of claim 5, including generating, by the service-requestor agent, the description of the requested service using capability definitions stored in a repository accessible on the network.

9. The method of claim 5 further comprising the step of: identifying a best match for each part of the plurality of parts of the entirety of the service.

10. The method of claim 9 further comprising the step of: generating a service plan based on the best match.

11. A computer-implemented method for collaborative problem solving within a data processing network, comprising the steps of:

receiving, by a first computer program functioning as a service-requestor agent on a computer network, a user request for a service, wherein the requested service includes a plurality of parts of an entirety of the service;

generating, by the service-requestor agent, a description of the requested service using capability definitions stored in a repository accessible on the network;

making the description of the request accessible on the network for computer programs functioning as service-provider agents having respective capabilities for providing services;

receiving bids from ones of the service-provider agents, wherein such a bid is for one of the service-provider agents to provide, independently of the other service-provider agents, at least one of the parts of the requested service;

comparing the bids to the requested service by the service-requestor agent for determining if the parts included in the bids provide the entire service;

describing a missing part by the service-requestor agent if the parts included in the bids do not provide the entire service; and receiving a plan for providing the missing part from at least one of the service-provider agents, wherein the missing part includes a plurality of sub-parts of an entirety of the missing part;

wherein the plan includes sub-parts of the requested service allocated among a number of the service-provider agents in a certain task execution sequence; and wherein at least one of the bids received at the receiving, is a bid for less than the of the service.

12. The method of claim 11, wherein the description of the capabilities of such a service-provider agent includes a description of functions of the service-provider agent and of resources external to, and accessible by, the service-provider agent.

13. The method of claim 11, wherein the step of making the description of the request accessible on the network for service-provider agents includes posting the description on the network.

14. A computer-implemented method for collaborative problem solving with a data processing network, comprising the steps of:

accessing, by computer programs functioning as service-provider agents, a description on the network of a user request for a service, wherein the service-provider agents have respective capabilities for providing services;

comparing the requested service with capability descriptions of the respective service-provider agents, wherein the requested service includes a plurality of parts of an entirety of the service and such a service-provider agent determines from the comparing whether the service-provider agent is capable of providing a service for at least one such part;

sending bids on the network to a service-requestor agent by ones of the service-provider agents, wherein such a bid is for one of the service-provider agents to provide, independently of the other service-provider agents, at least one of the parts of the requested service;

accessing a description on the network of at least one missing part by least a certain one of the service-provider agents; and generating a plan for providing the missing part by the certain one of the service-provider agents, wherein the missing part includes a plurality of subparts of an entirety of the missing part and wherein the plan includes sub-parts of the missing part allocated among a number of the service-provider agents in a certain task execution sequence;

wherein at least one of the bids sent at the sending step is a bid for less than the entirety of the service.

15. The method of claim 14, wherein the step of generating the plan includes describing at least one of the sub-parts by the certain service-provider agent and receiving at least one bid by at least one of the other service-provider agents to provide, independently of still others of the service-provider agents, the at least one sub-part of the requested service.

* * * * *